W. M. KELLY.
TYPE SETTING AND DISTRIBUTING MACHINE.
APPLICATION FILED NOV. 27, 1912.

1,165,104.

Patented Dec. 21, 1915.
10 SHEETS—SHEET 3.

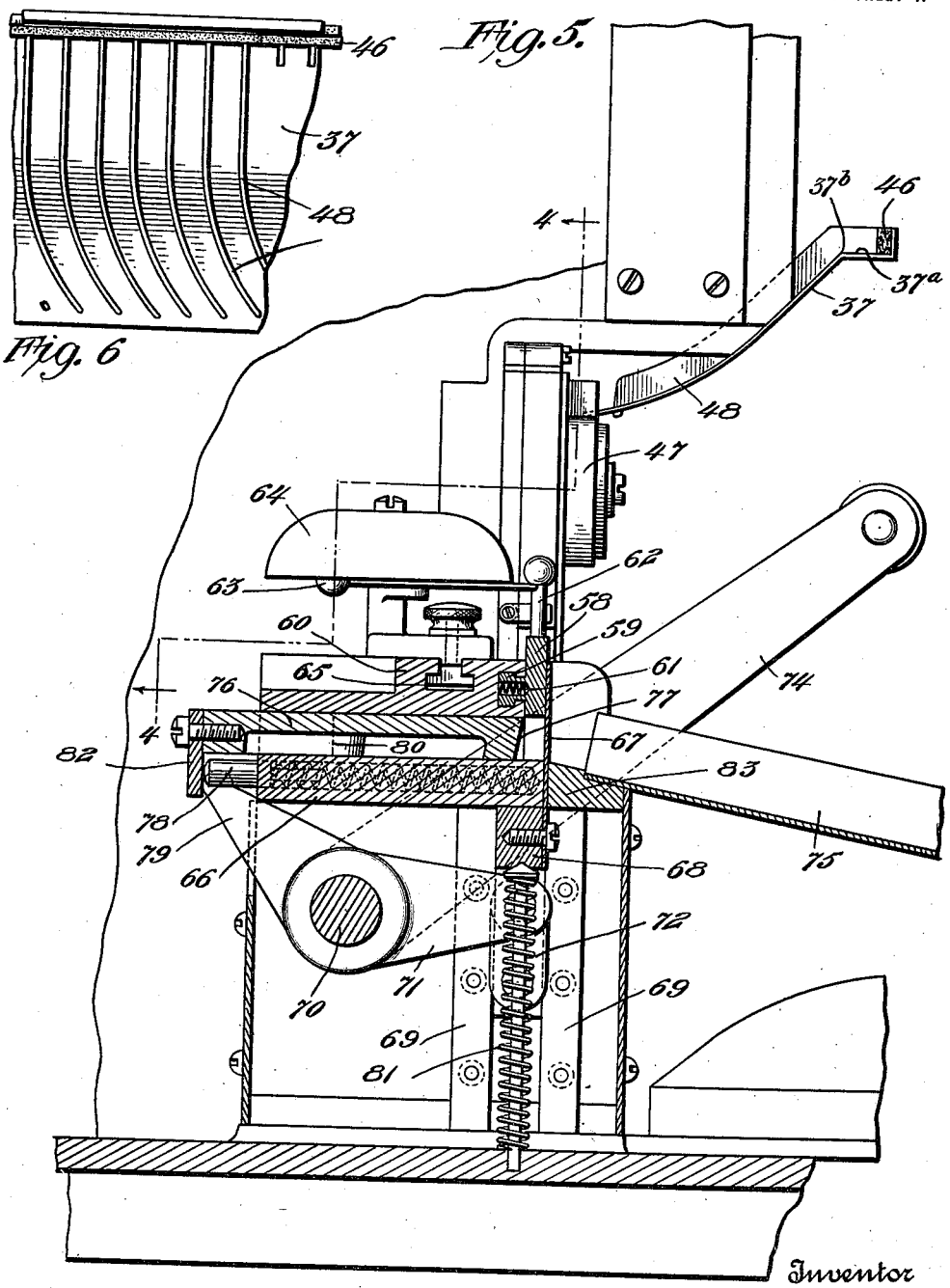

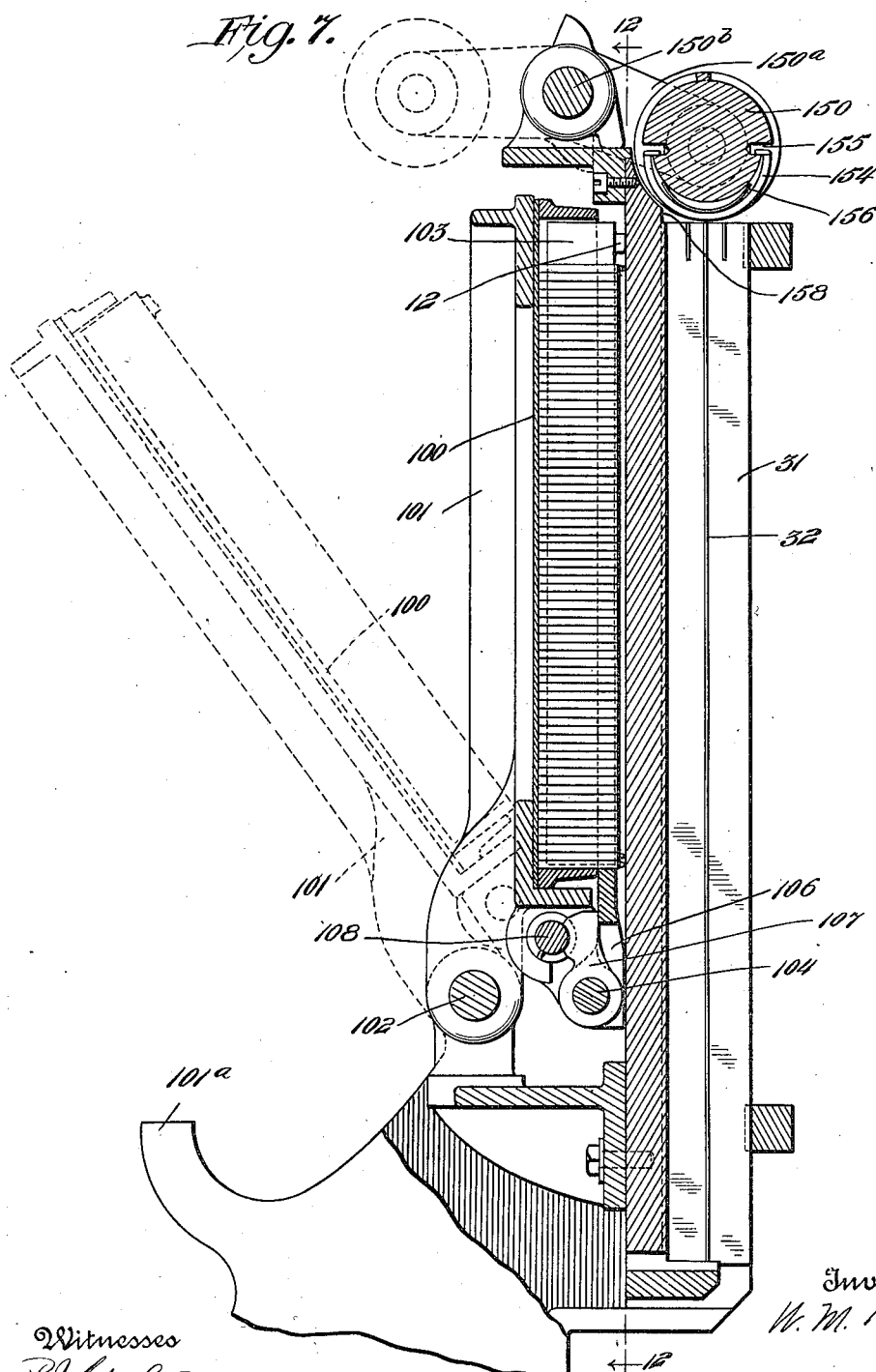

W. M. KELLY.
TYPE SETTING AND DISTRIBUTING MACHINE.
APPLICATION FILED NOV. 27, 1912.

1,165,104.

Patented Dec. 21, 1915.
10 SHEETS—SHEET 6.

Witnesses
P. J. Gathmann
H. M. Spangler

Inventor
W. M. Kelly
by Foster Freeman Watson & Co.
Attorneys

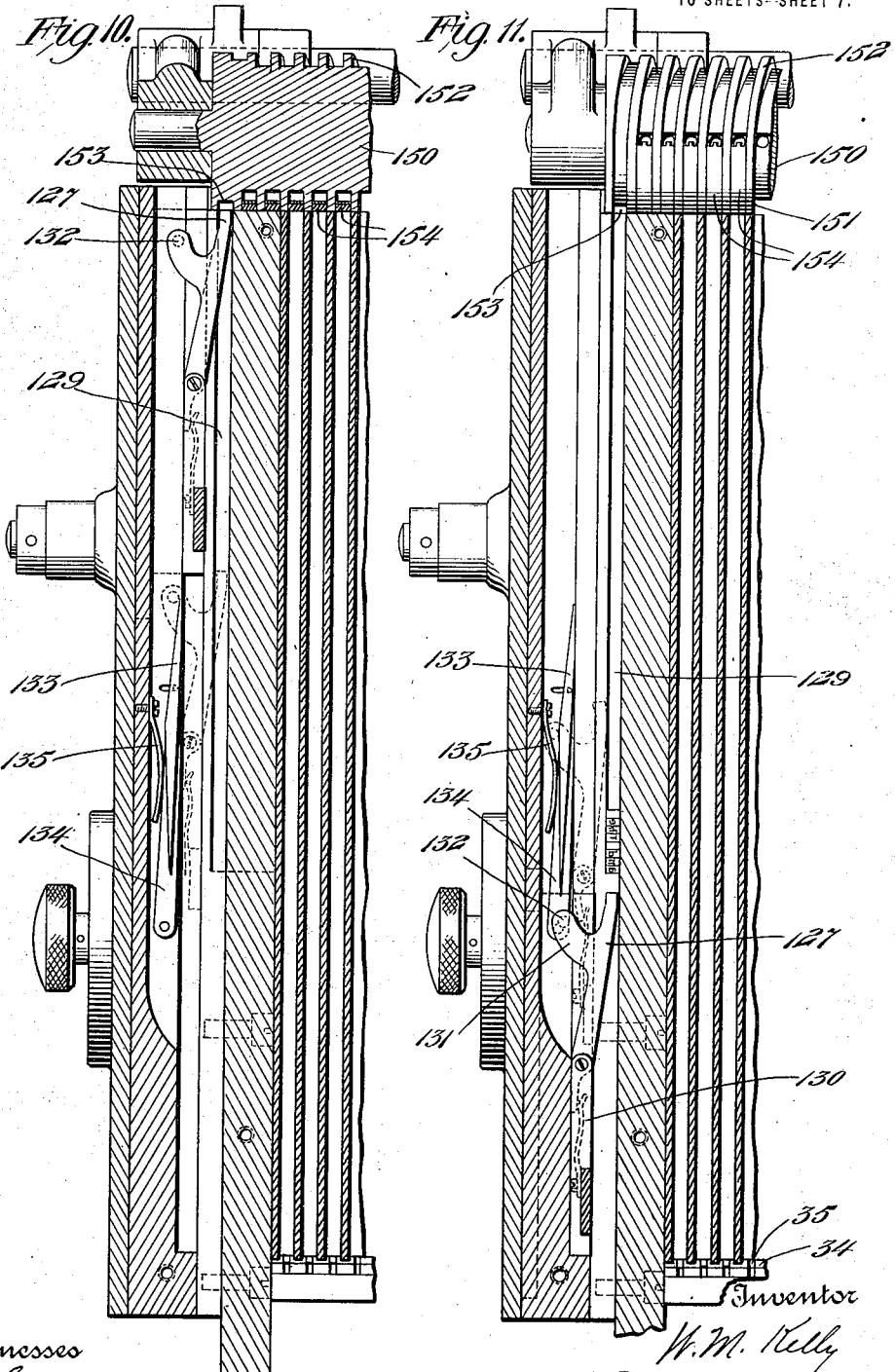

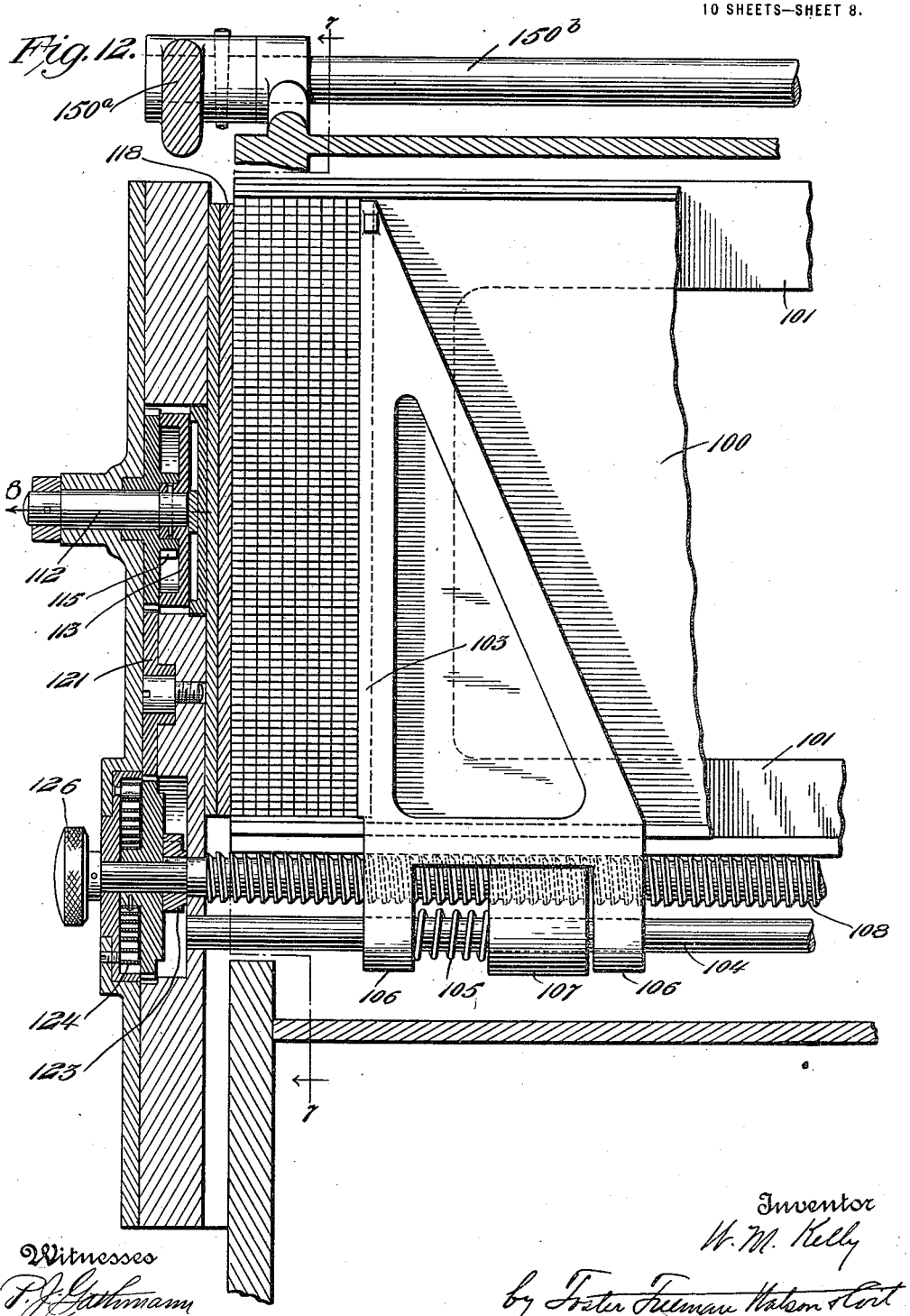

W. M. KELLY.
TYPE SETTING AND DISTRIBUTING MACHINE.
APPLICATION FILED NOV. 27, 1912.
1,165,104.
Patented Dec. 21, 1915.
10 SHEETS—SHEET 9.
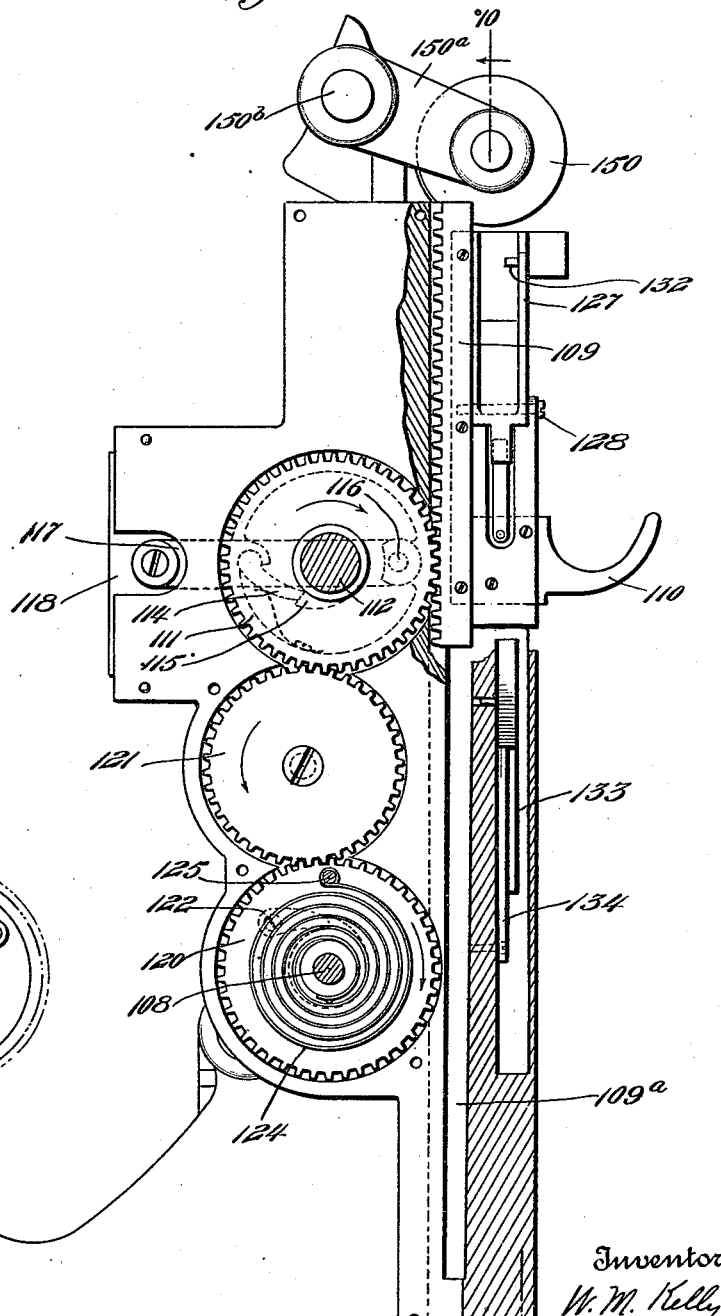
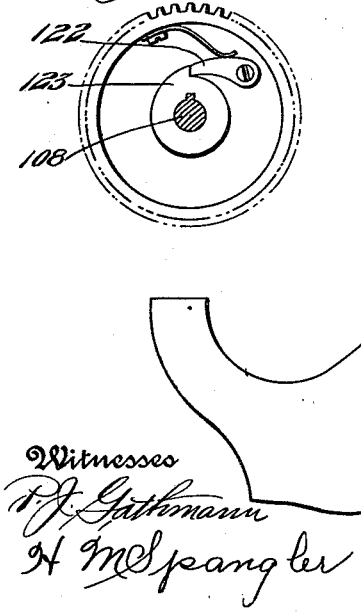

W. M. KELLY.
TYPE SETTING AND DISTRIBUTING MACHINE.
APPLICATION FILED NOV. 27, 1912.
1,165,104.
Patented Dec. 21, 1915.
10 SHEETS—SHEET 10.
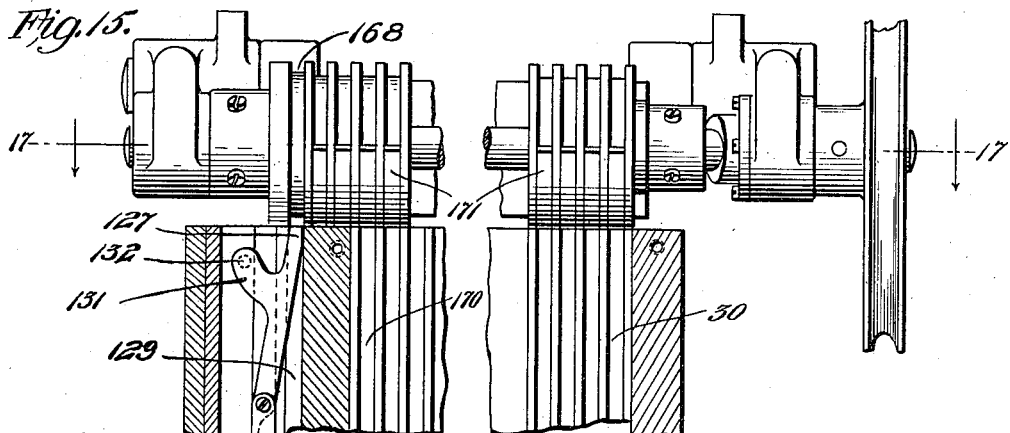
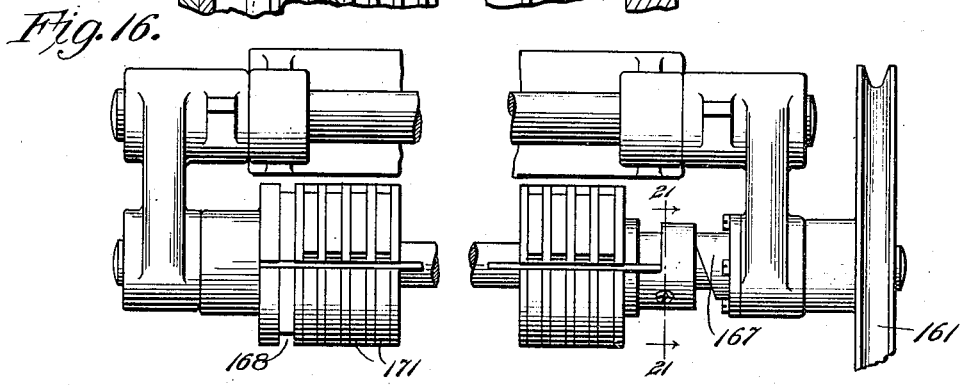
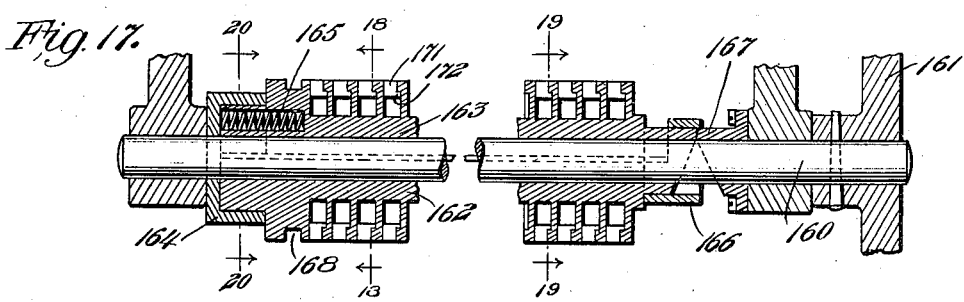
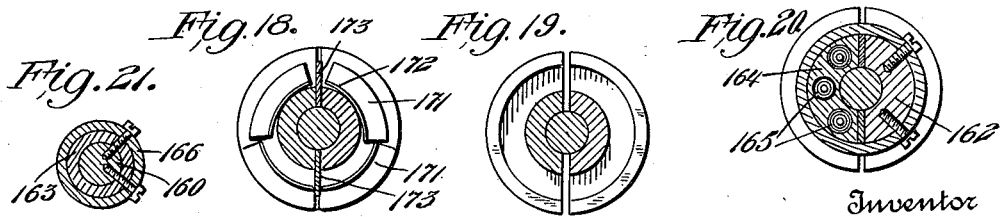
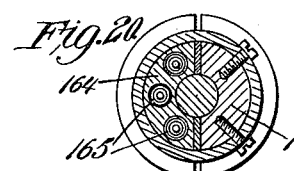
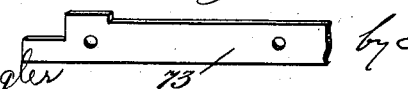

UNITED STATES PATENT OFFICE.

WILLIAM M. KELLY, OF NEW YORK, N. Y.

TYPE SETTING AND DISTRIBUTING MACHINE.

1,165,104.  Specification of Letters Patent.  Patented Dec. 21, 1915.

Application filed November 27, 1912. Serial No. 733,869.

*To all whom it may concern:*

Be it known that I, WILLIAM M. KELLY, a citizen of the United States, and resident of New York, county and State of New York, have invented certain new and useful Improvements in Type Setting and Distributing Machines, of which the following is a specification.

The object of the present invention is to provide type distributing mechanism for typesetting machines and particularly for machines for use in business offices and other places where it is necessary or desirable to set up circular letters, forms, and other matter for business or professional purposes.

The invention comprises distributing mechanism for automatically taking the dead matter from a galley, line by line, and distributing the type into the channels of the assembling mechanism of the typesetter. The distributing mechanism is power operated and substantially automatic.

In the embodiment of the invention illustrated in the accompanying drawings, the machine is adapted for the use of type of uniform width, such as the type usually employed to print circular letters in imitation of typewriting.

Some of the features of my invention are equally applicable to machines employing ordinary printers' type having bodies of different thicknesses.

The invention will be described in detail in connection with the accompanying drawings, in which—

Figure 1:
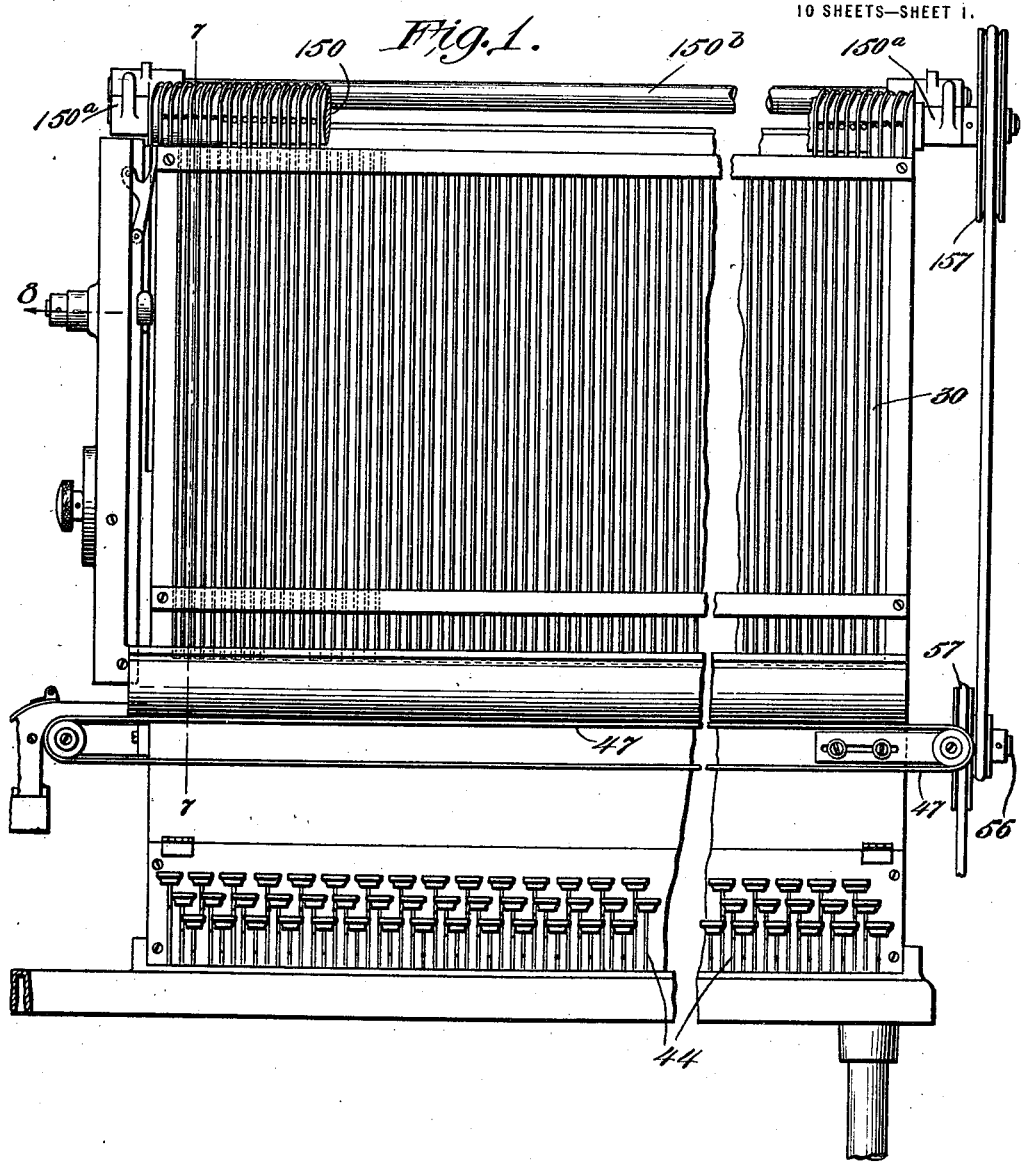
Figure 2:
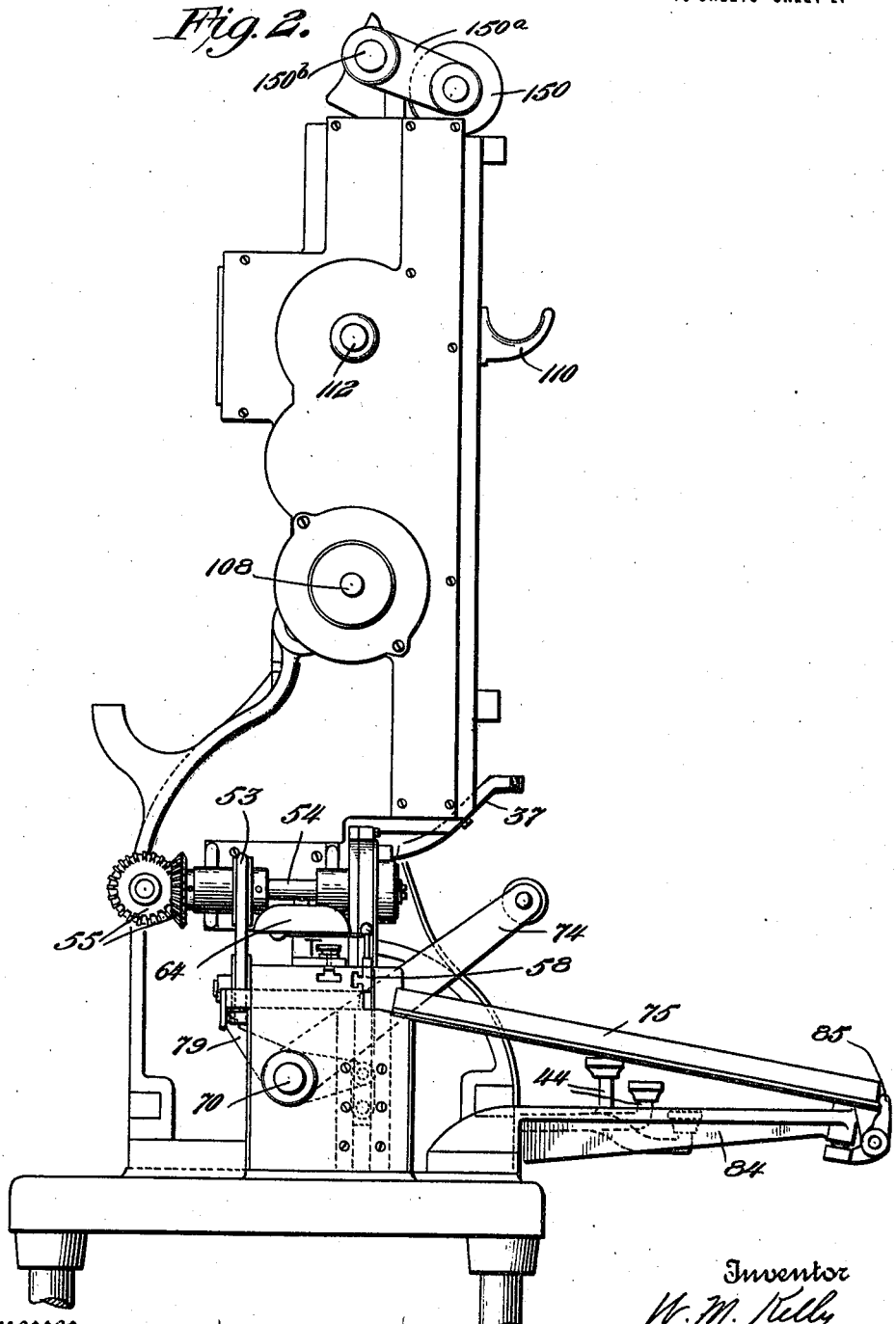
Figure 3:
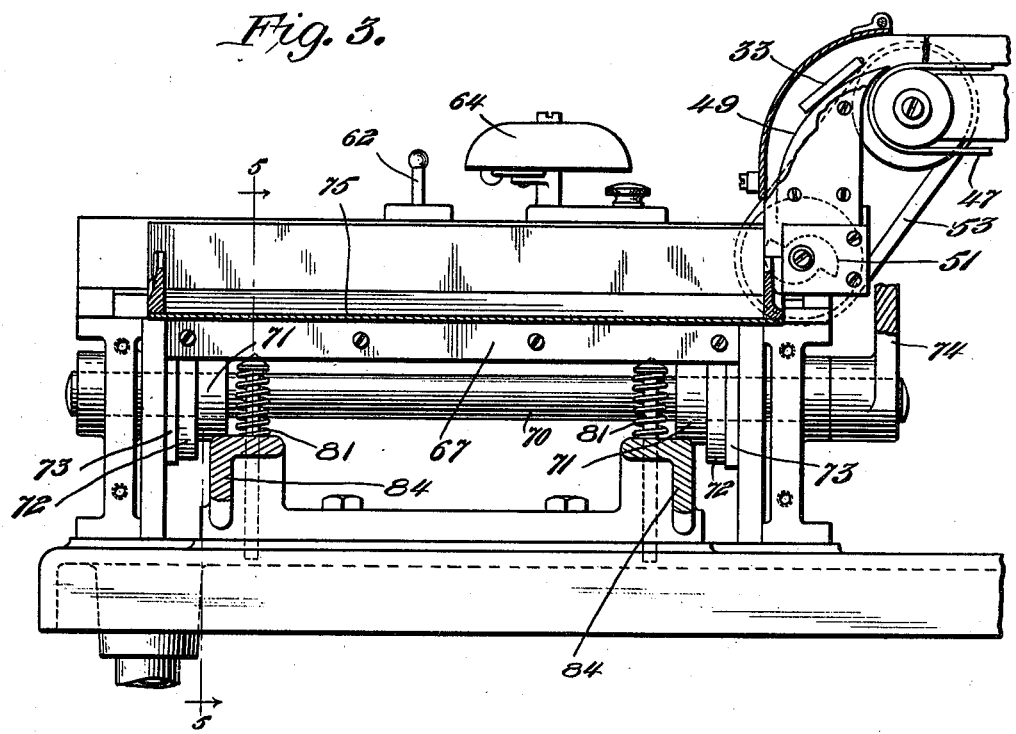
Figure 4:
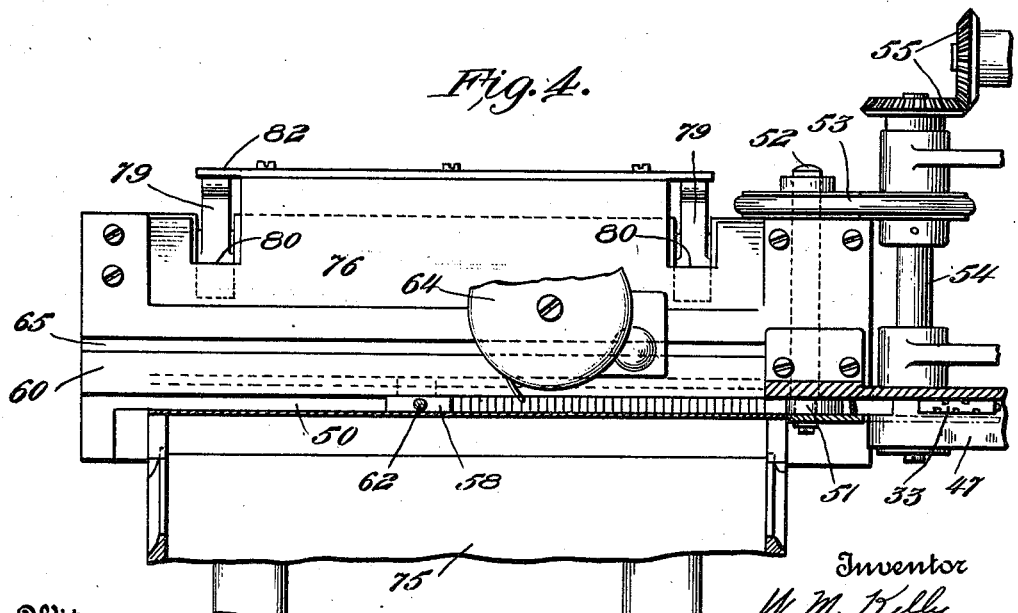
Figure 8:
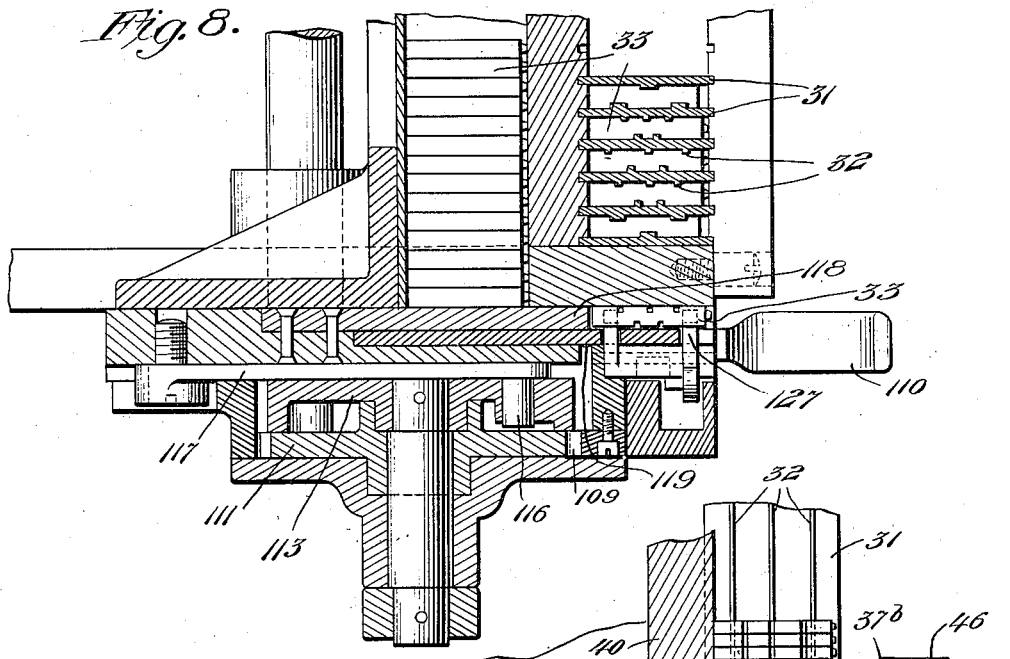
Figure 9:
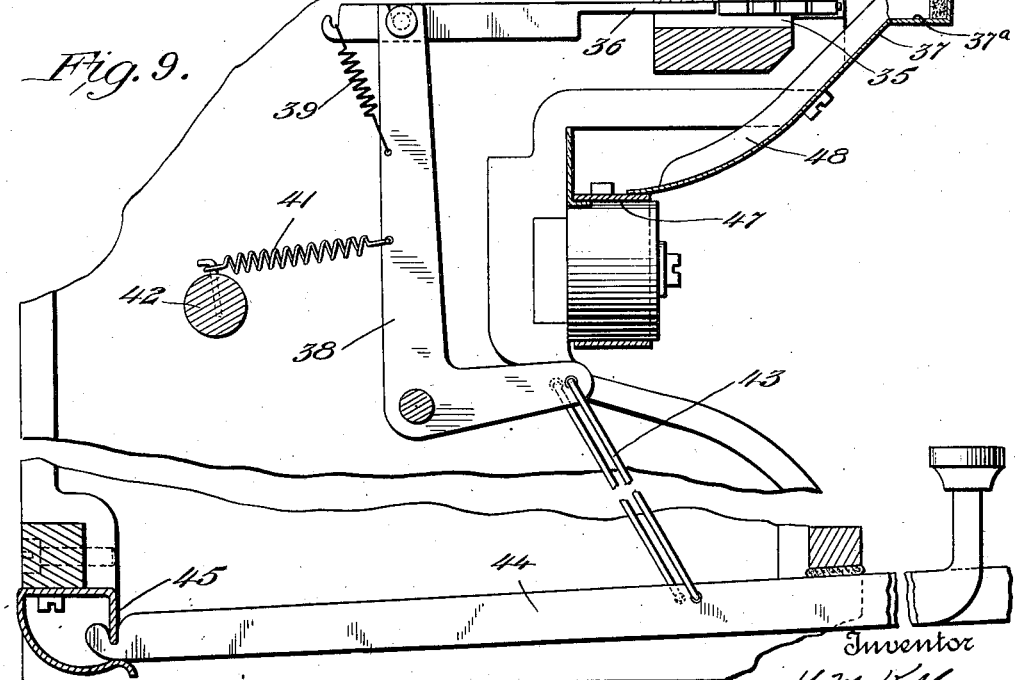

Figure 1 is a front elevation of the machine, the left end portion being broken away; Fig. 2 is a left end view of the entire machine; Fig. 3 is a front elevation of the left end portion, the galley support being broken away; Fig. 4 is a plan view of the mechanism shown in Fig. 3; Fig. 5 is a section on the line 5—5 of Fig. 3; Fig. 6 is a detail showing the guides for directing the type to the assembling belt; Fig. 7 is a vertical section on the lines 7—7 of Figs. 1 and 12; Fig. 8 is a horizontal section on the line 8 of Figs. 1 and 12; Fig. 9 is a sectional view showing the type ejecting mechanism; Figs. 10 and 11 are sectional views about on the line 10—11 of Fig. 13; Fig. 12 is a section on the line 12—12 of Fig. 7; Fig. 13 is a left end view of the parts shown in Fig. 12, the outer casing being removed; Fig. 14 is a detail view of one of the gears shown in Fig. 13; Figs. 15 to 22 inclusive illustrate a modified form of the distributing mechanism in which Fig. 15 is a front elevation; Fig. 16 is a plan view; Fig. 17 is a central sectional view through the step feed shaft; Fig. 18 is a section on the line 18—18 of Fig. 17; Fig. 19 is a section on the line 19—19 of Fig. 17; Fig. 20 is a section on the line 20—20 of Fig. 17; Fig. 21 is a section on the line 21—21 of Figs. 16 and 17; Fig. 22 is a detail of one of the division plates on the stepping cylinder.

Referring to the drawings, 30 indicates a magazine of the typesetting machine. The magazine comprises a plurality of channels separated by partition plates 31, the partition plates being provided with suitable combinations of rib projections or wards 32 corresponding to nicks in the type 33 (Figs. 8 and 9). The type are moved over the tops of the channels step by step by the distributing mechanism to be hereinafter described, each type being permitted to rest for a moment over each channel until it comes to the channel having wards corresponding to the nicks in the type. Having no support over its own channel the type drops in. The wards may extend down nearly to the bottom of the partition plates, as shown in Fig. 9 or they may extend but a short distance from the top with the exception of a single ward which is necessary to guide the type to the bottom, as shown in Fig. 7. The lowest types in the several channels rest upon a plate 34 having slots 35 through which ejectors 36 operate to push the type out from the channels onto a slideway 37 (Figs. 9, 10 and 11). The ejector is pivotally connected to an elbow lever 38 and a light spring 39 connects its rear end with the elbow lever for the purpose of holding the forward end of the ejector against the rear wall 40 of the magazine and in line with the bottom type in the corresponding channel of the magazine. The ejectors are normally retracted and held in position shown in Fig. 9 by springs 41 which connect the vertical arms of the elbow levers 38 with hooks on a shaft or rod 42. The forwardly projecting arms of the elbow lever are connected by links 43 with key levers 44 which are pivoted at their rear ends upon a fulcrum plate 45. It will be evident from an inspection of Fig. 9 that when a key is depressed the elbow lever will be rocked and the lowest type from the corresponding magazine will be pushed forward onto the slide 37. The support 35 for the type extends forward only slightly beyond the middle of the type and hence it is necessary to push each type forward only slightly more than half its length to free it from the magazine. The slide or incline 37 has a substantially horizontal portion 37ᵃ in the plane of the bottom of the channels 31 at an angle 37ᵇ between the horizontal portion and the inclined portion of the slide. When a type is ejected from its channel its forward end rests upon the horizontal surface 37ᵃ before the rear end is released from the channel. When the type is released from the channel its forward end rests on the flat surface 37ᵃ and the type is thus controlled and prevented from accidentally turning over. If the type is struck forcibly its forward end or face will be protected from injury by a suitable cushion 46. When a type is in its forward position, with the forward end resting on the surface 37ᵃ, the center of gravity of the type will be in rear of the angle 37ᵇ and the type will immediately tip backward and slide upon its side down the incline 37 and onto the belt 47. It will be guided so as to arrange itself longitudinally on the belt by webs or ribs 48 on the inclined guide 37. The type are carried, feet foremost, by the belt and when they reach the left end of the belt they travel over a guide 49 and land on their feet in an assembling channel 50. They are moved into this channel as they arrive by a double cam or packer 51 on a shaft 52 which is continuously driven by a belt 53. As shown, the belt 53 is driven from the shaft 54 which also drives the assembling belt 47. As shown in Figs. 1 and 4, the shaft 54 is driven by beveled gears 55 from a longitudinal shaft 56 which is continuously driven by a belt and pulley 57 from a suitable source of power.

In the assembling channel 50 is a frictional device or "preceder" against which the type are packed and which moves ahead of the line and holds the type upright and in compact arrangement. As shown in Figs. 4 and 5, the preceder consists of a block 58 having an arm 59 traveling in an undercut groove in the top plate 60. A spring 61 in a recess of the arm 59 insures sufficient friction to hold the preceder in any position to which it may be moved. Extending upward from the preceder is a pin 62 which contacts with the arm of a bell hammer 63 and rings a bell 64 to indicate when a line of type is complete. The bell is adjustably mounted in a slot 65 in the top plate 60 and may be shifted to indicate lines of different lengths.

The top plate 60 constitutes the rear wall of the type channel 50. The bottom of the channel is formed by an under-plate 66 (Figs. 3, 4 and 5) and the front wall of the channel is a vertically movable plate 67 which may be withdrawn downward to permit the type to be ejected into the galley. The plate 67 is carried by a bar 68 which is guided vertically by pairs of guides 69. A rock shaft 70 has arms 71 which are connected by links 72 with slides 73 rigidly connected with the bar 68 and located between the guides 69. When the shaft 70 is rocked by means of a hand lever 74, the front wall 67 of the assembling channel is moved downward until its upper edge is below the bottom of the type channel 50. By the same movement of the rock shaft the type line is moved sidewise out of the channel into the galley 75. The type are thus moved into the galley by a pusher plate or line ejector 76 (Figs. 3, 4 and 5) which has its forward face 77 arranged at right angles to the bottom of the galley, which is preferably inclined downward and outward to cause the type to stand properly in it. The line ejector 76 is normally retracted by spring-pressed pins 78, as shown in Fig. 5. When the top of the front wall 67 of the type channel reaches the level of the bottom of the channel, arms 79 on the shaft 70 contact with surfaces 80 on the ejector 76 and move the ejector forward, transferring the line into the galley. When the hand lever 74 is released springs 81 raise the front wall or slide 67 to its normal position, rocking the shaft 70, and the arms 79 on said shaft contact with a plate 82 on the rear of the ejector slide and assist the spring pins 78 in returning the slide to its normal position, with its front face just in rear of the type channel 50. The rear end of the galley 75 is preferably removably seated in a shelf 83 having its top surface inclined and flush with the bottom of the galley. The front end of the galley is supported on brackets 84 and removably held on the brackets by a latch or latches 85. The front wall or slide 67 moves vertically between the shelf 83 and the bottom plate 66, both of which are fixed.

*Distributing mechanism.*—The type channels of the magazine are refilled by automatic distributing mechanism which will now be described. A galley 100 containing type or dead matter to be distributed is placed in a holder 101 which is hinged on a rod 102 on the back of the machine, as shown in Figs. 7 and 12. The holder may be thrown back to receive the galley, as shown in dotted lines in Fig. 7 and then it is moved up into vertical operative position, as shown in full lines in said figure. A rest 101ª is provided for the holder 101 when thrown back into horizontal position. Working in the galley 100 is a slide or galley pusher 103 which holds the type in place and moves the entire body of type forward line by line to the distributing mechanism. The galley pusher 103 is pivotally mounted on a rod 104 (Figs. 7 and 12) and it is continuously urged toward the left side of the machine by a spring 105 interposed between one of the lugs 106 of the galley pusher and a threaded block 107 which slides on the rod 104 and cooperates with threads on a screw shaft 108. The shaft 108 is given one complete turn for each line of type taken from the galley 100 and the pitch of the screw 108 is such that the block or nut 107 is advanced the thickness of one line of type each time a line is removed from a galley. The spring 105 is thus maintained under substantially uniform tension throughout the travel of the galley pusher 103 and causes the pusher to move along the galley and shift all of the type line by line up to the distributing mechanism.

After a line of type has been distributed the next succeeding line in the dead matter galley is moved forward into the plane of the lines of type in the magazine of the assembling mechanisms. The devices for moving the line of type forward will now be described. These devices are operated by simply pulling down a rack 109 by means of a handle 110 (Figs. 1, 2, 8 and 13). The rack 109 meshes with the gear 111 which is free on a shaft 112. Adjacent the gear and mounted on the shaft 112 is a crank disk 113 carrying a spring-pressed pawl 114 which is adapted to engage a projection 115 on the gear (Fig. 13). The disk 113 has a crank pin 116 which is connected by means of a pitman or link 117 with a slide 118 which extends vertically at the left end of the dead matter galley 100 and is adapted to engage the foremost line of type and move the same forward into the plane of the magazine (Figs. 8, 12 and 13).

When the rack 109 is pulled down the gear 111 is given a full rotation and the disk 113 is given a complete rotation by engagement of the pawl 114 with the projection 115. This movement of the disk withdraws the pusher 118 and permits the galley pusher to advance the dead matter to the left carrying the foremost line against a fixed plate 119 (Fig. 8). On the forward movement of the pusher 118 the end line in the dead matter galley is moved forward to the position of the type 33 shown in Fig. 8. The line pusher 118 remains in its forward position as shown in Fig. 8 until the line of type has been fed to the distributing mechanism. While in this position the pusher 118 forms a rear wall of the line channel.

It will be noted that the rack 109 is little more than half the length of the periphery of the gear 111 and that by direct engagement with the gear 111 it is only capable of turning said gear through a half revolution. The gear 111 is in mesh with an idler gear 121 which, in turn, is in mesh with a gear 120 adjacent the slideway 109ª in which the rack 109 is guided. The gears are so related that the rack 109 comes into mesh with the gear 120 before it is disengaged from the gear 111. The rack turns the gear 111 approximately one-half revolution and then engages and turns the gear 120 through approximately one-half revolution in the same direction. Both gears are thus turned through a full revolution during one downward movement of the rack, the guideway 109ª being sufficiently long for this purpose. By this construction I am enabled to turn both gears through a full revolution without using a long rack and I am thus enabled to make the machine cheaper and much more compact, as it will be evident that a rack as long as the periphery of one of the gears would have to have a longer slideway and would project twice as far above the shaft of the gear 111 as does the rack 109 when in its uppermost position.

The screw 108 which operates the galley pusher 103 is turned through a complete revolution each time the rack 109 is pulled down to the bottom of the guideway 109ª. A spring-pressed pawl 122 on the gear 120 (Figs. 13 and 14) engages a shoulder on a collar 123, which is fast on the shaft 108, and when the gear 120 is turned the shaft is carried with it through a complete revolution. A spiral spring 124 is connected at one end with the hub of the gear 120 and at the other end with a fixed pin 125. This spring is under initial tension and it is additionally wound each time the rack 109 is pulled down. When the rack is released the spring moves the train of gears backward and raises the rack. This movement takes place slowly, the rack being used to feed the line of type to the distributer which picks off one type at a time and carries them to their appropriate channels in the magazine. The screw shaft 108 can be adjusted by hand to bring the follower 103 to any desired position and to place any desired tension upon the spring 105 by means of the knob 126 on the end of the shaft. The devices for raising the type line will now be described.

Referring to Figs. 8, 10, 11 and 14, 127 indicates a line pusher which is pivotally connected to the rack 109 at 128 and the upper end of which is normally held in type channel 129 by a spring 130 operating on the tail of the pusher. The pusher carries an arm 131 having a pin 132 which coöperates with a switch device 133 to throw the pusher out of the type channel 129 as it is being pulled down and as the new line of type is being forwarded from the dead galley into the channel. In going down the pin travels on the left side of the switch, which is angular. When it passes the lowest point of the switch, the pusher is free to spring back into the channel 129. The switch is carried on a pivot lever 134 which is spring pressed toward the right by a leaf spring 135. The switch is therefore free to yield to permit the pin 132 to pass it in rising. The pusher 127 is U-shaped having two prongs which enter the channel 129 as clearly shown in Fig. 8.

Upon pulling down the handle or fingerhold 110, a line of type will be thrown forward from the dead galley into the vertical channel 129 and upon releasing the handle the pawl 127 which has passed around the line from the upper position shown in Fig. 10 and through the dotted position shown in Fig. 10 to the full line position shown in Fig. 11 will tend to rise under the tension of the spring 124 and carry with it the line of type. The line will thus be fed upward until the last type in the line has been delivered to the distributer when the pawl will have again resumed the uppermost position, as shown in full lines in Fig. 10.

*Distributer proper.* — The distributer proper comprises means for carrying the type one by one across the tops of the channels of the magazines permitting each type to rest for a moment in register with each channel of the magazine. As previously explained each type has a combination of notches corresponding to a combination of wards to be found in one of the magazine channels and different from the combinations of wards in the other magazine channels. Therefore, each type will pass all channels of the magazine without dropping in excepting the particular channel to which it belongs. It is necessary that the type should be kept in a strictly horizontal position in passing from one channel to another and in resting over the channels to prevent it from catching or tripping on the upper ends of the magazine partitions. This is accomplished by means to be presently described.

Referring to Figs. 1, 7, 10 and 11, 150 indicates a cylinder having a continuous thread of intermittent pitch, that is, one half 151 of each complete turn of the thread is in a plane at right angles to the axis of the cylinder 150, whereas the other half 152 has a pitch equal to the distance from the center of one magazine channel to the center of the adjacent channel. The cylinder 150 is rotatable in bearings in arms 150ᵃ which are fixed on a shaft 150ᵇ. This arrangement permits the cylinder to be thrown back to the dotted position shown in Fig. 7 to permit of correction of any trouble between the cylinder and the magazine, such as the sticking of type in the mouths of the channels. The groove between the threads terminates at the left end in a shallow portion 153 having a depth equal to the thickness of one type, as shown in Figs. 10 and 11. The uppermost type in the channel 129 lies in this groove until it is shifted to the right by the inclined portion and thus cut off from the line. As the cylinder 150 continues to turn type after type drops into the groove 153 and is cut off from the line and moved step by step to the right, as shown in Fig. 10. In order to hold the type horizontally as they are shifted over the magazine, a pressure device is carried in the circular part of each turn of the groove. As shown in Figs. 7 and 11, each of these devices consists in an arc-shaped piece 154 of less diameter than the cylinder 150 and having inturned ends which engage diametrically opposite notches 155 in the cylinder. The notches are wide so that the piece 154 can move inward sufficiently to pass over a type which is resting on the magazine. The arc-shaped pieces 154 rest on the type during one half of each revolution of the cylinder 150. They may be made heavy enough to operate by gravity but it is preferred to force each piece radially outward by a light spring 156, as shown in Fig. 7. The cylinder 150, as shown, is driven by a pulley 157 which is belted to a small pulley on the shaft 56.

The operation of the distributer proper will be evident from the foregoing description.

The type are cut off from the line one by one by the shallow groove 153 at the left end of the cylinder 150 and at each revolution of the cylinder the type are moved one step to the right. As will be seen from inspection of Figs. 10 and 11, each type after three revolutions of the cylinder will be located exactly over the first or left hand channel of the magazine and will be held in this position during one half revolution of the cylinder. If its nicks do not correspond to the wards in this channel the type can not drop and it will therefore remain stationary and during the succeeding half revolution of the cylinder it will be moved over into register with the second magazine channel. Each type will thus be held stationary over and in register with each of the successive magazine channels until it reaches the channel to which it belongs. During the time when each type is over a magazine channel it must be held perfectly level and this is effected by the arc-shaped devices 154. It will be understood that the type adapted for this distributer are of uniform size. The arc-shaped devices 154 are free to move in all directions to a limited extent in planes at right angles to the cylinder 150 and hence they rest on the type during a complete semi-revolution of the cylinder. During such semi-revolution the type are thus held between the parallel threads and the devices 154. The ends of the type travel in contact with a surface 158 which keeps them in register with the general plane of the magazine. The operation of the cylinder is continuous while the movement of the type is intermittent.

In Figs. 15 to 22 inclusive I have shown a modification of the distributer proper in which the grooves of the cylinder are all in planes at right angles to its axis but the cylinder is split longitudinally and one half is given a forward reciprocating movement while engaging the type to carry the type forward step by step over the magazine and a rearward movement while disengaged from the type. Referring to these figures 160 indicates a shaft which may be constantly rotated by a pulley 161. It will be understood that the shaft is mounted in suitable bearings directly above the magazine, as shown in Fig. 15. The grooved cylinder is split longitudinally, one half, 162, being rigidly connected to the shaft 160 while the other half 163 is longitudinally movable on the shaft to the extent of the distance between the center of one magazine channel and the center of the adjacent channel. As shown, the left ends of the two semi-cylinders are confined in a cap 164 and the movable section 163 is urged to the right by springs 165 bearing on the cap 164 and situated in pockets in the section 163. The right ends of the semi-cylinders are confined on the shaft by a collar 166, which is fastened rigidly to the section 162 and to the shaft 160, as shown in Fig. 21. An extension or trunnion of the section 163 slides in this collar. The section 163 is given a longitudinal movement on the shaft by a suitable cam 167 which as shown is attached to one of the shaft bearings. The springs 165 constantly force the sections 163 against the cam and as the shaft rotates the section is moved longitudinally back and forth, as previously described.

The left hand groove 168 of the cylinder is of exactly the same cross section as the cross section of one of the type and the type are moved up into this groove from the channel 129 by any suitable means, such as that illustrated in Figs. 10 and 11. A type first enters the groove 168 in the immovable half of the cylinder 163. As the cylinder continues to turn the type enter the corresponding groove of the movable half of the cylinder and this half then begins to move to the right, cutting off the type from the type line in channel 129 and carrying it over one step toward the first magazine channel 170. This operation is repeated at each rotation of the cylinder and the type is moved step by step and permitted to dwell over each magazine channel during a semi-revolution of the cylinder, until it reaches the channel to which it belongs.

Means are provided for weighting the type and holding them horizontally while moving over the magazine, as follows: In each groove of each half cylinder there are two segmental pieces 171. The grooves are undercut at one side and the pieces 171 are provided with ribs 172 which prevent them from dropping out. Two such pieces are placed in each groove of each semi-cylinder before they are assembled on the shaft. To prevent the pieces from passing from one semi-cylinder to the other partition plates 173 are inserted between the semi-cylinders on opposite sides of the shaft. These partition plates are suitably connected to one of the semi-cylinders, or one to each of the semi-cylinders, as may be desired.

In operation the sectors fall by gravity into the position shown in Fig. 18, the outside peripheries of the lower sectors tending to become flush with the periphery of the ribs. They ride smoothly over the type and hold the type horizontally on the magazine channels. It will be understood that in both forms of the distributer the circular channels in the cylinders are only wide enough to permit the type to pass freely through them but not wide enough to permit the type to turn sidewise. In both forms also the grooves in which the arc-shaped pieces rest are deep enough to permit the arc-shaped pieces to rise and pass over the type without forcibly pressing the type against the magazine channels.

In so far as the mechanism herein described is concerned it will be evident that it is immaterial whether the pieces distributed bear ordinary type faces or intaglio faces, commonly termed matrices. I desire it understood, therefore, that the term " type " as used herein is generic and intended to include either ordinary type or matrices from which type faces may be cast.

Having described the invention what is claimed is:—

1. In a typographic machine, the combination with a magazine, of a distributing mechanism comprising a cylinder having threads and adapted to move the type step by step over the magazine, and means engaged with the cylinder and loosely arranged between the threads for bearing on the upper surfaces of the type during their travel over the magazine.

2. In a typographic machine, the combination with a magazine, of a distributing mechanism comprising a cylinder having threads and adapted to move the type step by step over the magazine, and segmental devices loosely arranged between the threads and adapted to bear on the type, for the purpose set forth.

3. In a typographic machine, the combination with a magazine, of a distributing mechanism comprising a cylinder having threads and adapted to move the type step by step over the magazine, segmental devices loosely engaged with the cylinder and located between the threads, and springs arranged to urge said segmental devices radially outward from the cylinder.

4. In a typographic machine, in combination with a magazine, a distributing device comprising a threaded cylinder arranged above the magazine and constructed to feed the type over the magazine, portions of the spaces between the threads being cut to substantially the depth of the type and other portions being cut deeper to form recesses, and segmental devices arranged in said recesses with freedom to move and to bear upon the type, for the purpose set forth.

5. In a typographic machine, the combination with a magazine, of a cylinder above the magazine and having a continuous thread for feeding type across the magazine, a portion of each turn of the thread having a pitch for feeding the type and another portion of each thread being in a plane at right angles to the axis of the cylinder to permit the type to dwell over the magazine channel.

6. In a typographic machine, the combination with a magazine, of a cylinder above the magazine and having a continuous thread for feeding type across the magazine, a semi-circular portion of each turn of the thread having a pitch sufficient to move a type from one magazine channel to the next and the other semi-circular portion of each thread being located in a plane at right angles to the axis of the cylinder to permit the type to dwell over each magazine channel, for the purpose set forth.

7. In a typographic machine, the combination with a magazine having upright channels with type selecting wards, of a threaded cylinder arranged over the magazine, and a hinged support for said cylinder to permit of raising it from the magazine to expose the mouths of the channels, the threads of the cylinder being constructed to intermittently feed the type to successive magazine channels and hold them momentarily over successive channels.

8. In a typographic machine, the combination with a dead matter galley, of a galley pusher arranged to advance the entire matter contained in the galley, and means for operating the pusher comprising an intermittently operated screw, a threaded nut or block coöperating with the screw, and a spring intermediate said nut or block and the pusher.

9. In a typographic machine, the combination with a magazine and a distributer over the magazine, of a line channel adjacent the magazine and means for feeding the type in said channel to the magazine comprising a pivoted pawl or pusher, a spring for holding the operative end of the pusher in the channel during its upward movement, and a switch for throwing the pawl out of the channel during its downward movement, for the purpose set forth.

10. In a typographic machine, the combination with a magazine and a distributer over the magazine, of a line channel adjacent the magazine and means for feeding the type in said channel to the magazine comprising a pivoted pawl or pusher, a spring for holding the operative end of the pusher in the channel during its upward movement, and a pivoted spring pressed switch for throwing the pawl out of the channel during its downward movement, for the purpose set forth.

11. In a typographic machine, the combination with a magazine and a distributer over the magazine, of a line channel adjacent the magazine and means for feeding the type in said channel to the magazine comprising a pivoted pawl or pusher, a spring for holding the operative end of the pusher in the channel during its upward movement, and a switch for throwing the pawl out of the channel during its downward movement, the pusher having an arm provided with a pin coöperating with the switch.

12. In a typographic machine, the combination with a line channel, a pusher for advancing the type in said channel, a rack connected with the pusher, and a train of gears, said rack being arranged to mesh successively with two gears in the train for the purpose set forth.

13. In a typographic machine, the combination with a line channel, a pusher therein, and a rack connected with the pusher, of a train of gears, and a spring for impelling said gears in one direction, the rack being arranged to mesh successively with two of the gears and adapted to wind up the spring when traveling in one direction and to be moved by the spring in the opposite direction.

14. In a typographic machine, the combination with a type channel, a galley, and a pusher for moving lines of type successively from the galley to the channel, of a gear, a crank and link connection between the gear and the pusher whereby the pusher is given a double reciprocation for each complete turn of the gear, a rack having fewer teeth than the gear and in mesh therewith, a second gear, the rack being adapted to mesh with said gears successively, and an idler between the said gears, for the purpose set forth.

In testimony whereof I affix my signature in presence of two witnesses.

WILLIAM M. KELLY.

Witnesses:
 JOHN S. BRAND,
 ALEXR. B. WRIGHT.